US008699518B2

(12) United States Patent
Wang et al.

(10) Patent No.: US 8,699,518 B2
(45) Date of Patent: Apr. 15, 2014

(54) DYNAMIC CIRCUIT ADJUSTMENT

(75) Inventors: Xi Wang, Murphy, TX (US); Qiong Zhang, Plano, TX (US); Paparao Palacharla, Richardson, TX (US); Takao Naito, Tokyo (JP)

(73) Assignee: Fujitsu Limited, Kawasaki-shi (JP)

( * ) Notice: Subject to any disclaimer, the term of this patent is extended or adjusted under 35 U.S.C. 154(b) by 610 days.

(21) Appl. No.: 12/905,147

(22) Filed: Oct. 15, 2010

(65) Prior Publication Data

US 2012/0093507 A1 Apr. 19, 2012

(51) Int. Cl.
*H04J 3/16* (2006.01)
(52) U.S. Cl.
USPC ............................ 370/468; 370/216; 370/222
(58) Field of Classification Search
None
See application file for complete search history.

(56) References Cited

U.S. PATENT DOCUMENTS

| | | | |
|---|---|---|---|
| 6,542,511 B1 * | 4/2003 | Livermore et al. | 370/406 |
| 6,947,670 B1 * | 9/2005 | Korotky et al. | 398/59 |
| 7,245,635 B2 * | 7/2007 | Mo et al. | 370/468 |
| 7,336,680 B2 * | 2/2008 | Sorenson et al. | 370/468 |
| 7,349,431 B2 * | 3/2008 | Svacek et al. | 370/468 |
| 2009/0047019 A1 * | 2/2009 | Palacharla et al. | 398/59 |

OTHER PUBLICATIONS

Labovitz; "What European do at Night"; http://ascrt.arbornetworks.com/2009/08/what-europeans-do-at-night/ ; pp. 9, Sep. 14, 2010.
Labovitz; "The Internet After Dark (Part 1)"; http://asert.arbornetworks.com/2009/08/the-internet-after-dark/ ; pp. 14, Sep. 14, 2010.

* cited by examiner

*Primary Examiner* — Ian N Moore
*Assistant Examiner* — Latresa McCallum
(74) *Attorney, Agent, or Firm* — Baker Botts L.L.P.

(57) ABSTRACT

A system and method are provided for dynamically reconfiguring an optical circuit between a first node and a second node of a communication network. The system and method may include establishing a scheduling window for receiving a plurality of optical traffic demands, classifying the plurality of optical traffic demands into at least a set of bandwidth adjustable demands and a set of fixed bandwidth demands, provisioning a first set of provisioned wavelengths from the plurality of wavelengths to carry the set of fixed bandwidth demands during the scheduling window, allocating the bandwidth remaining on the first set of provisioned wavelengths to the set of bandwidth adjustable demands, and if necessary, provisioning a second set of provisioned wavelengths from the plurality of wavelengths to carry the bandwidth required by the set of bandwidth adjustable demands that could not be allocated to the first set of provisioned wavelengths.

6 Claims, 5 Drawing Sheets

DYNAMIC CIRCUIT ADJUSTMENT

TECHNICAL FIELD

This invention relates generally to the field of optical communication networks and more specifically to dynamically adjusting the configuration of optical network circuits.

BACKGROUND

A communication network includes paths of nodes that route packets through the network. The paths between nodes may include one or more circuits. As modern communication applications require ever-increasing amounts of data, communication networks are required to handle increasingly sophisticated data loads. These data loads may require real-time allocation of network resources as higher priority applications vie for scarce bandwidth. Additionally, the increasing desirability of real-time data communication adds to the data load while raising difficulties in adapting to the ever-changing bandwidth requirements of such applications. Further, as more and more computing applications move from localized computing resources to network-dependent, "cloud" computing, the effect of dynamic bandwidth requirements require increasingly adaptive methods of allocating network resources. The large amounts of data required by these types of applications may require a dedicated, point-to-point path rather than the distributed, packet-based approach offered by the traditional internet architecture.

One current method of dynamically allocating network resources is dynamic circuit switching. With dynamic circuit switching, the circuits between nodes of a communication network are not prepared for communication until the communication path is required. When a high-bandwidth application requires a high-availability connection, a circuit, or dedicated communication path, can be prepared between two nodes to facilitate that communication.

Among other disadvantages of current methods of dynamically allocating network resources, dynamic circuit switching may not be flexible enough to accommodate massive, diversified data requests across multiple sites. For instance, communication between multiple datacenters that includes multiple types of data requests may not be able to be efficiently accommodated. Additionally, dynamic circuit switching may only provision one circuit at a time, based on the received request. Further, current methods of dynamically allocating network resources may only schedule a group of circuits between a first source node and a first destination node at one time before then scheduling a group of circuits between a second source node and a second destination node.

SUMMARY OF THE DISCLOSURE

In accordance with the present invention, disadvantages and problems associated with previous techniques for dynamically allocating network resources may be reduced or eliminated.

According to one embodiment of the present invention, a method is provided for dynamically reconfiguring an optical circuit between a first node and a second node of a communication network. The optical circuit may include a plurality of wavelengths available for provisioning. The method may include establishing a scheduling window for receiving a plurality of optical traffic demands, classifying the plurality of optical traffic demands into at least a set of bandwidth adjustable demands and a set of fixed bandwidth demands, provisioning a first set of provisioned wavelengths from the plurality of wavelengths to carry the set of fixed bandwidth demands during the scheduling window, allocating the bandwidth remaining on the first set of provisioned wavelengths to the set of bandwidth adjustable demands and, if necessary, provisioning a second set of provisioned wavelengths from the plurality of wavelengths to carry the bandwidth required by the set of bandwidth adjustable demands that could not be allocated to the first set of provisioned wavelengths.

Certain embodiments of the invention may provide one or more technical advantages. A technical advantage of one embodiment may be that dynamically reconfiguring an optical circuit based on optical traffic demands received during a scheduling window allow for more efficient allocation of the bandwidth within the optical circuit. In some embodiments, classifying optical traffic demands into at least categories for bandwidth-adjustable, and fixed bandwidth categories allows for this scheduling window allocation to handle a greater diversity of massive data requests.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 7 of the drawings, like numerals being used for like and corresponding parts of the various drawings.

Figure 1:
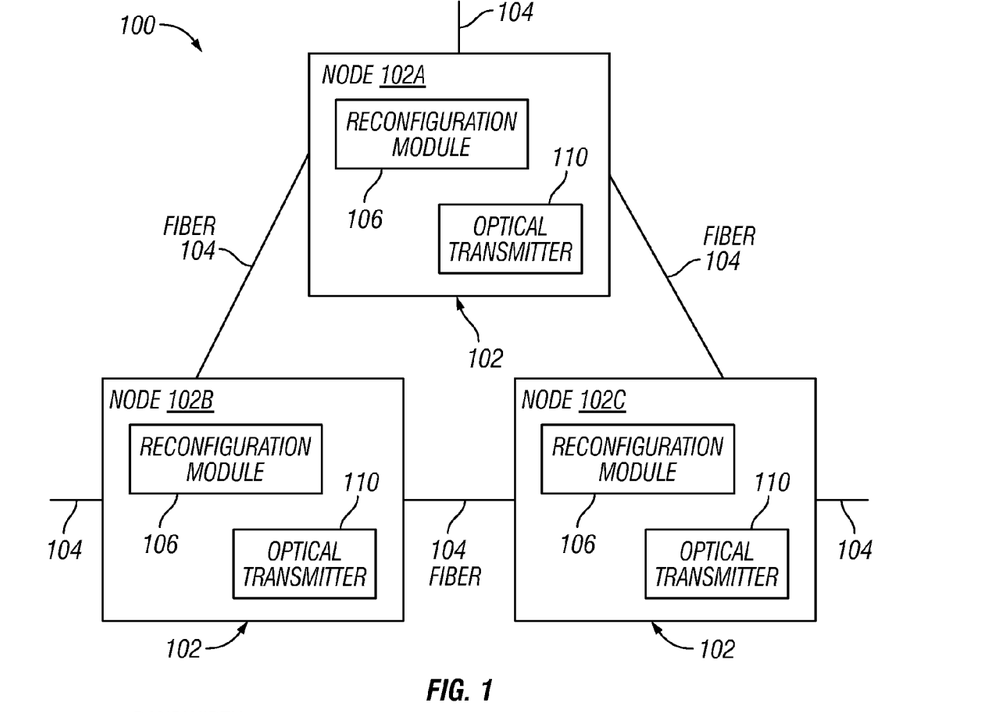
FIG. 1 illustrates an optical communication network system, in accordance with certain embodiments of the present disclosure.

FIG. 1 illustrates an optical communication network system, in accordance with certain embodiments of the present disclosure. Optical network system 10 includes components such as network nodes 102. In general, a network node 102 may include any suitable arrangement of components operable to perform the operations of the network node. As an example, a network node may include logic, an interface, memory, other component, or any suitable combination of the preceding. "Logic" may refer to hardware, software, other logic, or any suitable combination of the preceding. Certain logic may manage the operation of a device, and may comprise, for example, a processor. "Processor" may refer to any suitable device operable to execute instructions and manipulate data to perform operations.

"Interface" may refer to logic of a network node operable to receive input for the network node, send output from the network node, perform suitable processing of the input or output or both, or any combination of the preceding, and may comprise one or more ports, conversion software, or both.

"Memory" may refer to logic operable to store and facilitate retrieval of information, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

In some embodiments, node 102 may also include reconfiguration module 106. Reconfiguration module 106 may be configured to dynamically allocate bandwidth of the optical circuits connected to node 102, as described in more detail below with reference to FIGS. 2-7. In some embodiments, reconfiguration module 106 may be an integrated part of a switch card, or may be implemented in some other appropriate hardware and/or software running on hardware within node 102.

In some embodiments, node 102 may also include optical transmitter 110. Optical transmitter 110 may be configured to transmit provisioned wavelengths to other nodes 102 of network system 100.

Network system 100 communicates information through signals, such as an optical signal. For instance, an optical signal may have a frequency of approximately 1550 nanometers and a data rate of 10, 20, 40, or over 40 gigabits per second. As an illustrative example, the carrier wavelengths of network system 100 may transmit data at 10 Gigabits per second, in accordance with the 10 Gigabit Ethernet standard. For ease of discussion in this disclosure, this illustrative example transmission rate will be used throughout, and referenced as "10 Gb" or "10 Gb/s."

According to the illustrated embodiment, network system 100 may include one or more networks. A network may include nodes 102 coupled by fibers 104 in a mesh topology as shown in FIG. 1 or any other suitable topology, such as a liner or ring topology. In the illustrated embodiment, the network includes three nodes, referenced as 102A, 102B, and 102C. These references are intended for use solely for ease of description. Although three nodes are illustrated, the network may contain more or fewer nodes, depending on the implementation desired.

Nodes 102 of network system 100 may communicate with one another through "circuits," or dedicated communication paths. For example, a path using fiber 104 connecting node 102A and node 102B would comprise one or more circuits between nodes 102A and 102B. Additionally, a path using fiber 104 between node 102A and node 102C and fiber 104 between node 102C and node 102B would comprise one or more circuits between nodes 102A and 102B.

Network system 100 may be used in any optical communication network, or any other suitable network or combination of networks. Optical fibers 104 comprise any suitable type of fiber, such as a Single-Mode Fiber (SMF), Enhanced Large Effective Area Fiber (E-LEAF), or TrueWave® Reduced Slope (TW-RS) fiber.

In some embodiments, network system 100 may be designed to transmit each signal on a particular carrier wavelength. The number of wavelengths assigned may vary depending on the chosen implementation. As an illustrative example, network system 100 may carry 88 carrier wavelengths in the 1550 nm wavelength band, with a channel separation of 50 GHz (~0.4 nm). That is, network system 100 may potentially communicate information on carrier wavelengths between 1528.77 nm (196.1 THz) and 1563.45 nm (191.75 THz). In some embodiments, network system 10 may include some means of dynamically allocating incoming signals to various wavelengths, depending on the design needs, such that none, some, or all channels are in use at one time.

The process of communicating information over multiple channels of a single optical path is referred to in optics as wavelength division multiplexing (WDM). Dense wavelength division multiplexing (DWDM) refers to the multiplexing of a larger (denser) number of wavelengths, usually greater than forty, onto a fiber. WDM, DWDM, or other multi-wavelength transmission techniques are employed in optical networks to increase the aggregate bandwidth per optical fiber. Without WDM or DWDM, the bandwidth in networks would be limited to the bit rate of solely one wavelength. With more bandwidth, optical networks are capable of transmitting greater amounts of information. Referring back to FIG. 1, network system 100 may be operable to transmit disparate channels using WDM, DWDM, or some other suitable multi-channel multiplexing technique, and to amplify the multiplexed wavelengths.

In operation, network system 100 may receive a number of demands for routing optical traffic. In some embodiments, optical traffic demands may include a diverse range of requests for data transmission, including fixed-bandwidth connections, bandwidth adjustable connections with or without a transmission deadline, connections with a default minimum or maximum bandwidth requirements, and/or connections with a maximum permissible delay. For example, network system 100 may represent a network for communication between large datacenters. These datacenters may represent processing centers for application providers. These applications may include data backups, streaming audio and/or video, voice over IP, data transmission applications (e.g., data transfer for purposes other than backup), or any other application that may require a massive amount of data transfer. An application provider may have a service level agreement ("SLA") with end users of such applications requiring a certain level of service, e.g., specified up time, guaranteed data transmission rates, etc. In allocating the resources of network system 100, an application provider, or other party responsible for maintaining and/or operating network system 100, may wish to provision the optical circuits of network system 100 in such a manner as to minimize the number of dedicated wavelengths while meeting the requirements of a given SLA. The application provider, or other party responsible for maintaining and/or operating network system 100, may also wish to provision a group of optical circuits of network system 100 at one time. This group of optical circuits may be between a first source node and a first destination node and/or between a plurality of source nodes and a plurality of destination nodes.

In some embodiments, network system 100 may receive information describing future optical traffic ("optical traffic demands"). As an illustrative example, network system 100 may be under a service level agreement with an end user that requires a scheduled backup of data at a certain amount of time for a certain amount of data. As another example, digital media content providers (e.g., cinemas) may need to retrieve the digital content from a datacenter. Such a data transfer may be arranged to occur at a specific time. As a further example, educational and scientific institutions may need to retrieve data from a centralized laboratory (e.g., a particle accelerator such as the Large Hadron Collider). Such a data transfer may be arranged to occur at a specific time. As described in more detail below with reference to FIGS. 2-7, network system 100 may use the demand information to efficiently allocate bandwidth of the optical circuits to the various types of, and requests for optical traffic.

As described in more detail below with reference to FIGS. 2-6, network system 100 may establish a scheduling window over which it may attempt to provision a group of circuits at once. This may allow more flexible and efficient resource scheduling, as well as providing for more efficient handling of dynamic data requests. It may also allow for improved network efficiency by reducing the number, interval, and scope of reconfigurations of network system 100 when compared to other systems such as dynamic circuit switching.

Figure 2:
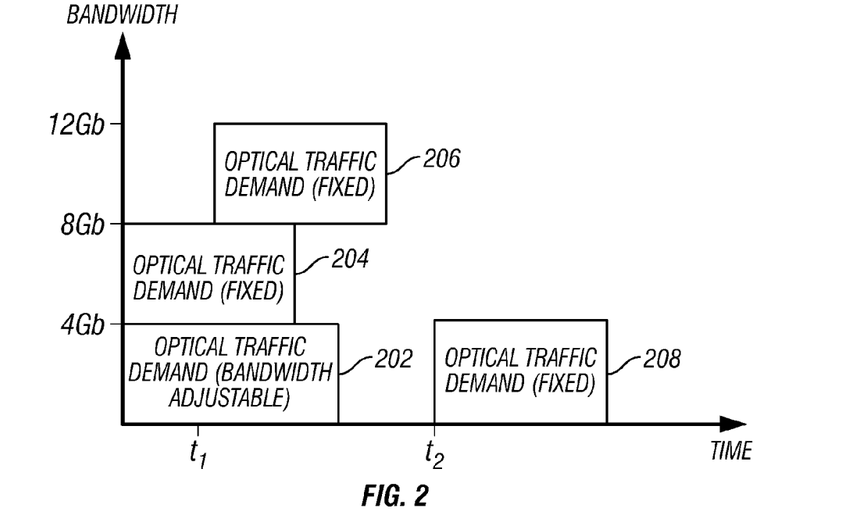
FIG. 2 illustrates a graph of a series of optical traffic demands as received by network system, in accordance with certain embodiments of the present disclosure.

FIG. 2 illustrates a graph 200 of a series of optical traffic demands 20 as received by network system 100, in accordance with certain embodiments of the present disclosure. In the illustrated embodiment, network system 100 receives four optical traffic demands 202, 204, 206, and 208 for communication of traffic between a pair of nodes 102. These four optical traffic demands 202, 204, 206, 208 may be of the same or different demand type. Additionally, these four optical traffic demands 202, 204, 206, 208 may be from different end users with different service level agreements for their respective data transfers. For instance, in the illustrated embodiment optical traffic demand 202 may be a bandwidth adjustable demand. A bandwidth adjustable demand may be, in some embodiments, a streaming video signal or any other type of optical traffic for which the required bandwidth may vary over time. As another example, a bandwidth adjustable demand may be internet backbone traffic. Likewise, optical traffic demands 204, 206, 208 may be fixed bandwidth demands. A fixed bandwidth demand may be, in some embodiments, a dedicated data transfer application such as a backup process that can transmit data at a certain rate.

In some embodiments, optical traffic demands 202, 204, 206, 208 may be of different bandwidth sizes and/or arrive at different times. For instance, optical traffic demands 202, 204, 206 may be demands for 4 Gb/s of bandwidth, while optical traffic demand 208 may be for 6 Gb/s. Although certain values for the illustrated optical traffic demands are disclosed here and throughout this specification, they should not be read as limiting. For example, network system 100 may receive substantially more than four optical traffic demands over the course of a scheduling window. Additionally, as described above with reference to FIG. 1, although this specification discusses optical traffic demands with the example 10 Gb optical traffic pattern, other communication standards may be implemented without departing from the present disclosure.

Referring back to the illustrative example of FIG. 2, should network system 100 allocate resources as it receives optical traffic demands 202, 204, 206, 208, it would require allocating two separate 10 Gb wavelengths. That is, because it would begin by provisioning one wavelength for optical traffic demands 202, 204, which required 8 Gb of bandwidth, when optical traffic demand 206 was received, network system 100 would need to allocate an additional carrier wavelength as the 4 Gb required by optical traffic demand 206 would require a combined 12 Gb bandwidth, greater than the 10 Gb allowed by a single wavelength. An alternative to provisioning circuits as demands are received is described in more detail below with reference to FIGS. 3-6.

Figure 3:
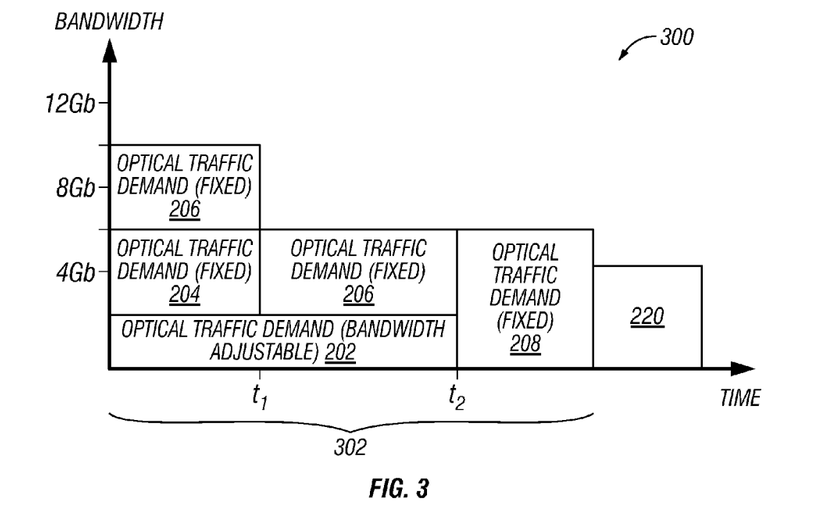
FIG. 3 illustrates a graph of a series of optical traffic demands as received by network system, in accordance with other embodiments of the present disclosure.

FIG. 3 illustrates a graph 300 of a series of optical traffic demands 20 as received by network system 100, in accordance with certain embodiments of the present disclosure. In the illustrated embodiment, network system 100 receives four optical traffic demands 202, 204, 206, and 208. These four optical traffic demands 202, 204, 206, 208 may be of the same or different demand type, as described in more detail above with reference to FIG. 2.

In some embodiments, network system 100 may establish a scheduling window 302 over which to schedule the transmission of optical traffic demands 202, 204, 206, 208. Scheduling window 302 may be measured in any appropriate time value, including seconds, minutes, and hours, depending on the desired implementation of network system 100. For example, if network system 100 were intended primarily as a datacenter for receiving scheduled backups, it may be necessary for scheduling window 302 to be measured in hours, as these types of applications may have a predetermined execution time period. As more diversified types of optical traffic requests are transmitted, however, it may be necessary to establish a scheduling window 302 over a shorter period of time. For instance, it may be desirable to recognize streaming video requests prior to their arrival. In scheduling such requests in addition to other types of requests, it may be desirable to establish a shorter scheduling window 302 to allow for more efficient allocation of the resources of network system 100.

As described in more detail above with reference to FIG. 2, optical traffic demand 202 may be an adjustable bandwidth demand, while optical traffic demands 204, 206, 208 may be fixed bandwidth demands. In some embodiments, network system 100 may attempt to provision the minimum number of wavelengths necessary to carry the incoming optical traffic demands. In some embodiments, this may require establishing a scheduling window for provisioning wavelengths. In contrast to the system and method illustrated in FIG. 2, optical circuits may not provision wavelengths until consideration has been given to all traffic scheduled for transmission during the scheduling window.

For example, optical network 100 may first provision wavelengths necessary to accommodate the fixed bandwidth demands 204, 206. In the illustrated example, which is intended only to aid in understanding, optical traffic demands 204, 206 collectively may require 8 Gb bandwidth. Additionally, in the illustrated example, network system 100 may recognize that the traffic described by optical traffic demand 208, a fixed bandwidth request, will arrive within the scheduling window, but not until after optical traffic demands 204, 206.

Next, in the illustrated example, network system 100 may recognize that the traffic described by optical traffic demand 202 is an adjustable bandwidth demand. As such, it may not be necessary to allocate the maximum amount of bandwidth requested by optical traffic demand 202 in order to meet the SLA detailing the performance requirements of optical traffic demand 202. That is, the SLA for optical traffic demand 202 may not require that optical traffic demand 202 be transmitted in the shortest period of time. Therefore, it may be advantageous to allocate a smaller amount of bandwidth to optical traffic demand 202 over a longer period of time. In the illustrated example, by allocating 2 Gb bandwidth to optical traffic demand 202, network system 100 may still be able to transmit optical traffic demands 202, 204, 206 before the arrival of optical traffic demand 208.

Additionally, by provisioning a smaller amount of bandwidth to optical traffic demand 202, network system 100 may only need to allocate one carrier wavelength as, in the illustrated example, optical traffic demands 204, 206 in combination with the smaller bandwidth allocated to optical traffic demand 202 may only be 10 Gb, or sufficient to be transmitted on a single carrier wavelength. In some embodiments, it may be the goal of network system 100 to minimize the number of carrier wavelengths provisioned. As a result, network system 100 may determine how much bandwidth to allocate to adjustable bandwidth demand(s) based not only on the SLA, but also on considerations of optical circuit efficiency.

The reconfiguration required of the optical circuit within network system 100 depicted in the illustrative example may require less frequent circuit reconfiguration than that required by other methods such as dynamic circuit switching, as described in more detail below with reference to FIG. 4.

Figure 4:
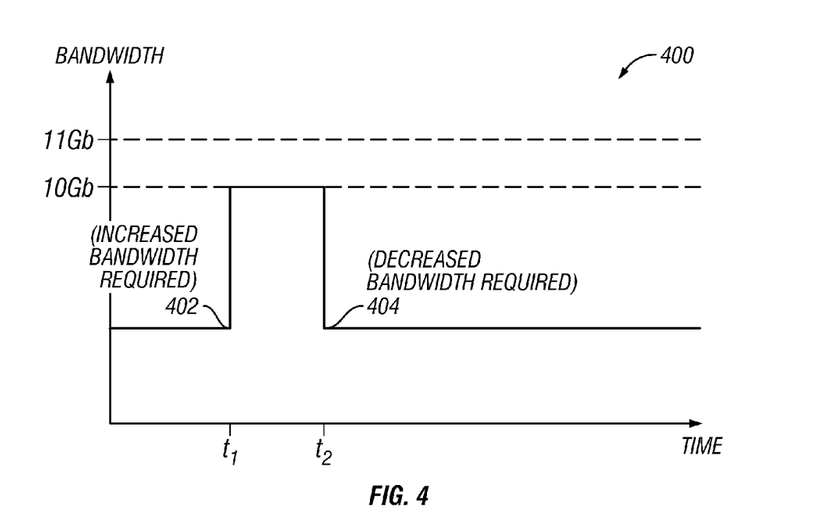
FIG. 4 illustrates a graph of a series of optical circuit provisioning steps in network system, in accordance with certain embodiments of the present disclosure.

FIG. 4 illustrates a graph 400 of a series of optical circuit provisioning steps in network system 100, in accordance with certain embodiments of the present disclosure. In some embodiments, such as the illustrative example of FIG. 3 above, network system 100 may provision carrier wavelengths within an optical circuit of network system 100 according to the bandwidth needs of received optical traffic demands. The illustrative example in FIG. 4 demonstrates the provisioning steps required to achieve the optical traffic demand scheduling depicted in FIG. 3 above. Step 402 illustrates the increased bandwidth required by the arrival of the traffic demands described by optical traffic demand 206. Prior to this arrival, network system 100 may only be required to make available 6 Gb bandwidth in order to accommodate the traffic described by optical traffic demands 202, 204, as described in more detail above with reference to FIG. 3. Upon the arrival of the traffic described by optical traffic demand 206, an additional 4 Gb is required. Network system may then, at step 402 provision the additional bandwidth through the use of an additional wavelength.

Similarly, at step 404, the optical traffic described by optical traffic demand 204 has finished transmitting and network system 100 may reduce the provisioned bandwidth to a level necessary for only the optical traffic described by optical traffic demands 202, 206. In the illustrative example of FIG. 3, this is the same level—6 Gb—required by the optical traffic described by optical traffic demand 208. Thus, only two provisioning steps 402, 404 are required to accommodate the illustrative example of FIG. 3. By contrast, in some dynamic circuit switching schemes, network system 100 may be required to reconfigure the optical circuit each time additional optical traffic arrives and/or completes transmission. In the illustrative example of FIG. 2, this may require as many as four provisioning steps.

In some embodiments, it may be necessary or desirable to take advantage of the bandwidth adjustable nature of certain optical traffic demands 20. The illustrative example of FIG. 3 above illustrated one situation in which this may be desirable. One additional consideration in taking advantage of bandwidth adjustable demands is that the actual bandwidth required by the optical traffic demand may vary over time. In certain embodiments, it may be necessary or desirable to dynamically adjust the provisioned wavelengths in accordance with actual usage data, as described in more detail below with reference to FIG. 5-7.

Figure 5:
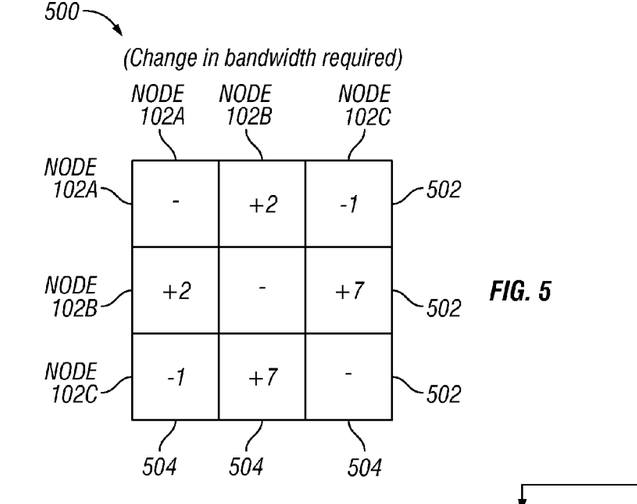
FIG. 5 illustrates a table of a change in bandwidth required for network system, in accordance with certain embodiments of the present disclosure.

FIG. 5 illustrates a table 500 of a change in bandwidth required for network system 100, in accordance with certain embodiments of the present disclosure. In some embodiments, network system 100 may receive actual usage data after provisioning optical circuits for transmission of optical signals 20. If the actual usage data shows a change in the previously provisioned bandwidth, it may be necessary or desirable to adjust the amount of bandwidth for and/or route of provisioned optical circuits. Such a change in actual usage may occur, for example, in a sudden spike in usage by a bandwidth adjustable demand application, such as video streaming or voice over IP.

Table 500 illustrates a number of rows 502 and columns 504. In the illustrated embodiment, each row 502 and column 504 corresponds to a node 102 of network system 100 as described in more detail above with reference to FIG. 1. Although only three nodes 102 of network system 100 are illustrated, network system 100 may contain more or fewer nodes 102, depending on the desired configuration. Table 500 is arranged in a manner such that each cell of table 500 contains a value representative of the change in bandwidth on a particular optical circuit. For example, the cell at the intersection of row 502 for node A and column 504 for node B contains the value "+2." It should be noted that the values contained in table 500 are for illustrative purposes only, and should not be construed as limiting.

In the illustrative example, the "+2" value may indicate that the bandwidth requirements for that particular optical circuit have increased by two Gb/s. Other numbers may indicate that the bandwidth requirements have increased by greater or lesser values, or that bandwidth requirements have decreased (e.g., "−1"). In FIG. 5, the "+2" value indicates that the optical channel from node A to node B has seen an increase in 2 Gb/s. Likewise, the "−1" value indicates that the optical channel from node A to node C has decreased 1 Gb/s, and the "+7" value indicates that the optical channel from node B to node C has increased 7 Gb/s.

The effect of these changes in actual bandwidth usage may best be illustrated by reference to an example. Referring back to FIG. 1, and as an illustrative example only, it may be that the bandwidth allocated to each of the optical channels between the nodes 102 of network system 100 prior to receiving actual usage data is 5 Gb/s. For example, the provisioned bandwidth may have been allocated as described in more detail above with reference to FIGS. 1-4.

After receiving the actual usage data, the bandwidth required to be provisioned may have changed. Referring again to FIG. 5, the optical channel between node 102A and node 102B may have changed from 5 Gb/s to 7 Gb/s (an increase of 2 Gb/s). Likewise, the optical channel between node 102A and node 102C may have changed from 5 Gb/s to 4 Gb/s, and the optical channel between node 102B and node 102C may have changed from 5 Gb/s to 12 Gb/s.

In this illustrative example, the increase in needed bandwidth in the optical channel between node 102A and node 102B would not require provisioning additional carrier wavelengths, as 7 Gb/s is still under the 10 Gb/s maximum for the currently provisioned wavelength. In some embodiments, the adjustment of bandwidth allocated to the optical circuit may be accomplished by an appropriate network container such as ODUflex.

By contrast, the increase in needed bandwidth in the optical channel between node 102B and node 102C may require the provisioning of an additional wavelength, as 12 Gb/s is over the maximum 10 Gb/s for the currently provisioned wavelength. However, it may be desirable to split the increase in desired bandwidth such that no additional provisioning of wavelengths is necessary. For example, by provisioning the maximum bandwidth for one wavelength (10 Gb/s) on the optical channel between node 102B and node 102C, only one wavelength is necessary, but 2 Gb/s (12 Gb/s desired bandwidth less the 10 Gb/s maximum) must still be allocated. As noted above, the optical channel between node 102B and node 102A currently needs only 7 Gb/s. One wavelength on this channel could accommodate the extra 2 Gb/s needed to get from node 102B to node 102C. Additionally, the optical channel between node 102A and node 102C currently needs only 4 Gb/s. One wavelength on this channel could also accommodate the extra 2 Gb/s need to get from node 102B to node 102C. By routing the extra 2 Gb/s traffic through node 102A, nodes 102B, 102C may continue to communicate via a dedicated optical channel. However, in that situation, only one provisioned wavelength is required for each optical channel.

In some embodiments, splitting optical traffic between multiple circuits may be accomplished by an appropriate dynamic traffic adjustment scheme, such as Virtual Concatenation (VCAT) or Link Capacity Adjustment Scheme (LCAS) for an Optical Transport Network protocol.

Although the illustrative example of FIG. 5 recites specific values in an attempt to facilitate understanding, it should not be construed that these values are limiting. In some embodiments, it may be necessary or desirable to account for actual bandwidth usage changes in hundreds of nodes provisioning thousands of carrier wavelengths. Accounting for some or all of the actual bandwidth usage changes in the nodes may allow for more efficient allocation of network resources, including a reduction in the number of reconfigurations required of network system 100, as described in more detail above with reference to FIGS. 1-5 and below with reference to FIGS. 6-7. The systems and methods disclosed in FIGS. 1-7 may be applicable to any network system 100 dynamically adjusting the optical circuits in the manner disclosed.

Figure 6A:
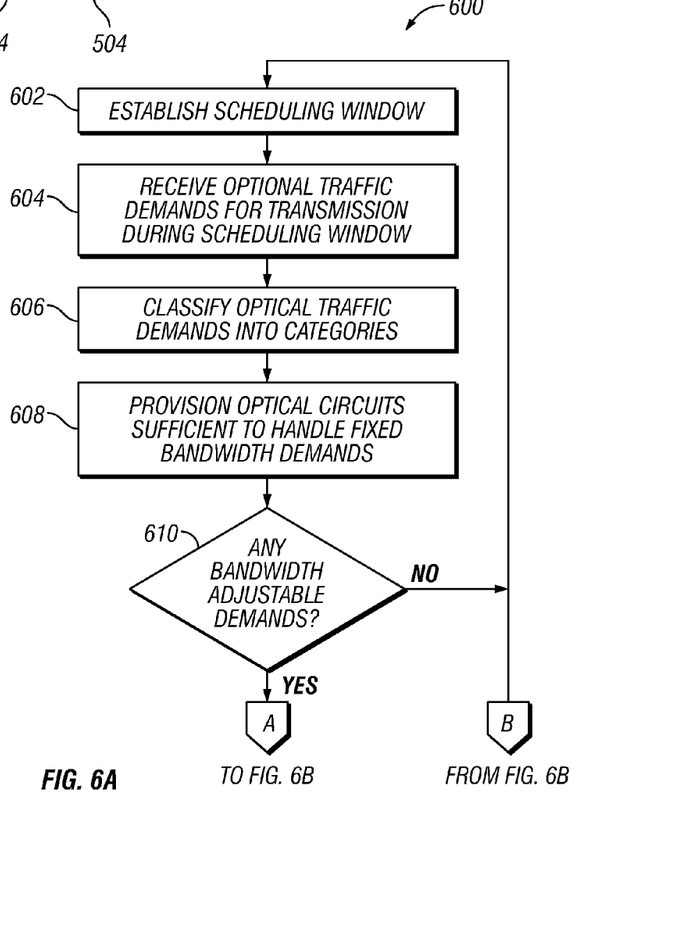
FIG. 6 is a flowchart illustrating one embodiment of a method of scheduling and provisioning a group of new optical circuits, in accordance with certain embodiments of the present disclosure.
Figure 6B:
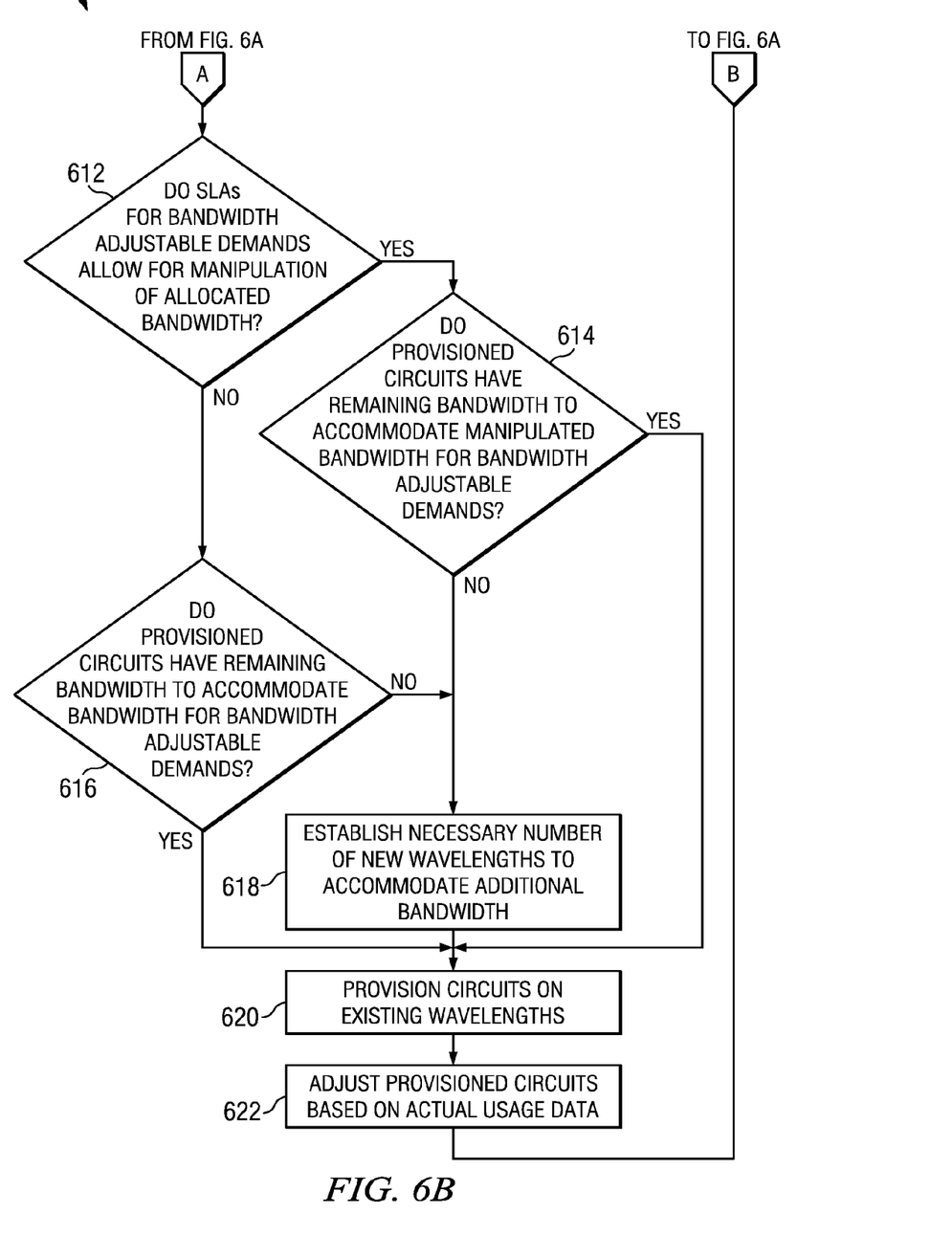

FIG. 6 is a flowchart illustrating one embodiment of a method 600 of scheduling and provisioning a group of new optical circuits at the same time, in accordance with certain embodiments of the present disclosure. Method 600 includes classifying requests into different groups and provisioning new circuits based on that classification.

According to one embodiment, method 600 preferably begins at step 602. Teachings of the present disclosure may be implemented in a variety of configurations of nodes 102 and network system 100. As such, the preferred initialization point for method 600 and the order of steps 602-622 comprising method 600 may depend on the implementation chosen.

At step 602, network system 100 establishes a scheduling window for optical traffic demands to be communicated via network system 100, as described in more detail above with reference to FIGS. 1-5. After establishing the scheduling window, method 600 may proceed to step 604, where network system 100 may receive optical traffic demands for transmission during the established scheduling window. After receiving optical traffic demands, method 600 may proceed to step 606.

At step 606, method 600 may classify optical traffic demands into a plurality of categories. In some embodiments, the plurality of categories may include adjustable bandwidth demands and fixed bandwidth demands, as described in more detail above with reference to FIGS. 1-5. In other embodiments, additional categories may be included, such as distinguishing between adjustable bandwidth demands with transmission deadlines and those without. After classifying optical traffic demands, method 600 may proceed to step 608.

At step 608, method 600 may provision optical circuits sufficient to handle any identified fixed bandwidth demands, as described in more detail above with reference to FIGS. 1-5. After accommodating the fixed bandwidth demands, method 600 may proceed to 610, where method 600 may determine whether any bandwidth adjustable demands exist. If there are bandwidth adjustable demands, method 600 may proceed to step 612. If there are not bandwidth adjustable demands, method 600 may return to step 602.

At step 612, method 600 may determine whether the SLAs for the identified adjustable bandwidth demands allow for manipulation of the allocated bandwidth, as described above with reference to FIGS. 1-5. For example, it may be possible to allocate only a portion of the bandwidth desired by an adjustable bandwidth demand at any given time in order to optimize the provisioned circuits. If the SLAs do allow for manipulation of allocated bandwidth, method 600 may proceed to step 614. If the SLAs do not so allow, method 600 may proceed to step 616.

At step 614, method 600 may determine whether the currently provisioned circuits have sufficient bandwidth to accommodate the bandwidth adjustable demands that allow for manipulation of the allocated bandwidth, as described in more detail above with reference to FIGS. 1-5. If there is available bandwidth, method 600 may proceed to step 620, where method 600 may provision optical circuits on existing wavelengths to accommodate the bandwidth adjustable demands. If there is no available bandwidth, method 600 may proceed to step 618, where method 600 may establish a necessary number of new wavelengths to accommodate additional bandwidth before proceeding to step 620.

At step 616, method 600 may determine whether currently provisioned optical circuits have remaining bandwidth to accommodate the bandwidth adjustable demands that do not allow for manipulation of the allocated bandwidth. If there is available bandwidth, method 600 may proceed to step 620, where method 600 may provision optical circuits on existing wavelengths to accommodate the bandwidth adjustable demands. If there is no available bandwidth, method 600 may proceed to step 618, where method 600 may establish a necessary number of new wavelengths to accommodate additional bandwidth before proceeding to step 620.

After provisioning circuits on existing wavelengths at step 620, method 600 may proceed to step 622, where method 600 may adjust the provisioned circuits based on actual usage data, as described in more detail above with reference to FIG. 5 and below with reference to FIG. 7.

Although FIG. 6 discloses a particular number of steps to be taken with respect to method 600, method 600 may be executed with more or fewer steps than those depicted in FIG. 6. In addition, although FIG. 6 discloses a certain order of steps comprising method 600, the steps comprising method 600 may be completed in any suitable order. For example, method 600 may determine whether there are any bandwidth adjustable demands prior to provisioning optical circuits sufficient to handle the fixed bandwidth demands.

Figure 7:
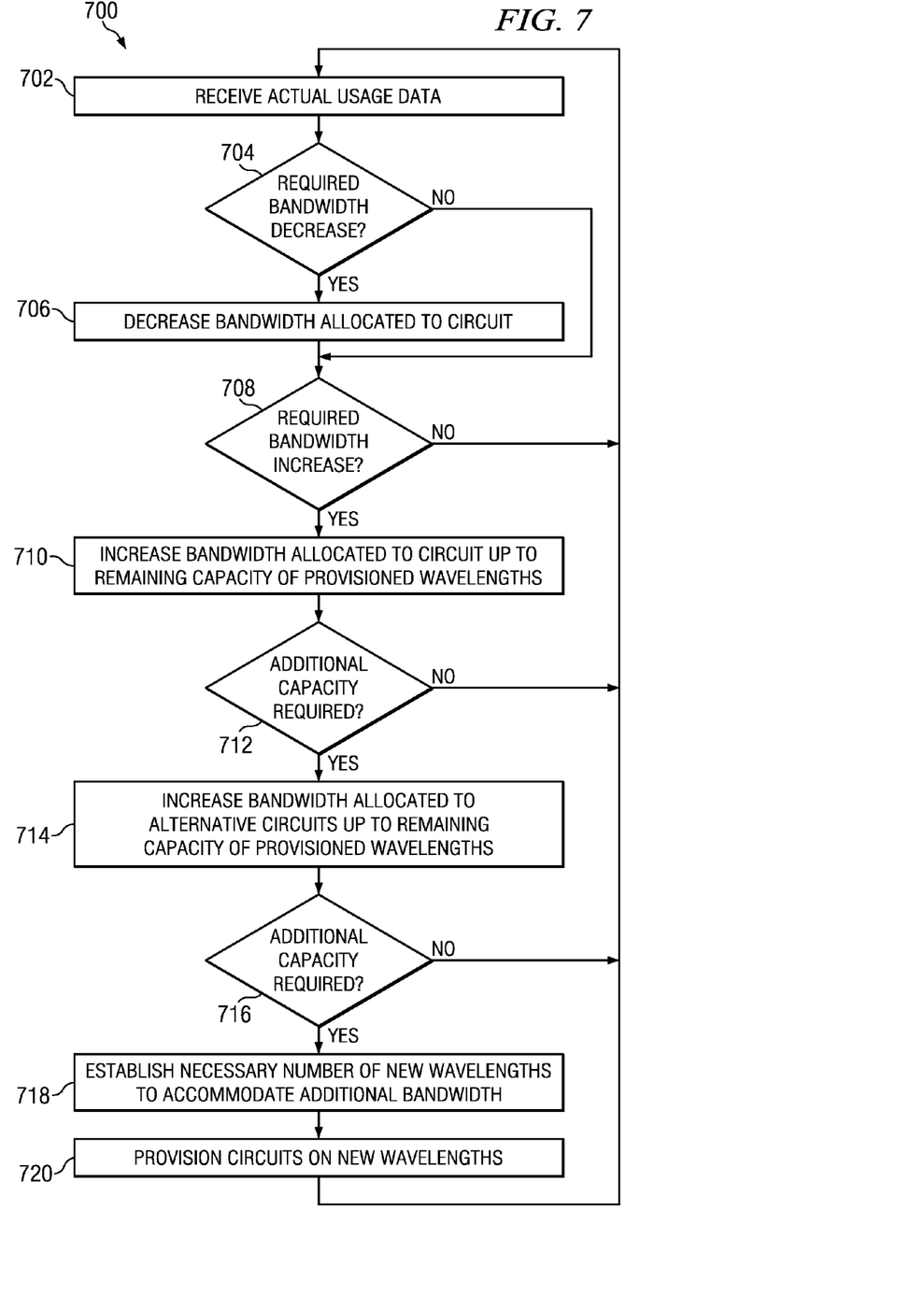
FIG. 7 is a flowchart illustrating one embodiment of a method of periodically adjusting the allocated bandwidth of existing optical circuits, in accordance with certain embodiments of the present disclosure.

FIG. 7 is a flowchart illustrating one embodiment of a method 700 of periodically adjusting the allocated bandwidth of a group of existing optical circuits at the same time, in accordance with certain embodiments of the present disclosure. Method 700 includes allocating increases in required bandwidth to existing optical circuits if possible, including allocating increases to alternative circuits between the same two nodes.

According to one embodiment, method 700 preferably begins at step 702. Teachings of the present disclosure may be implemented in a variety of configurations of nodes 102 and network system 100. As such, the preferred initialization point for method 700 and the order of steps 702-720 comprising method 700 may depend on the implementation chosen.

At step 702, method 700 may receive actual usage data. As described in more detail above with reference to FIG. 5, the actual usage may be more than what was originally demanded. After receiving the actual usage data, method 700 may proceed to step 704, where method 700 may determine whether there was a decrease in required bandwidth. If there has been a decrease, method 700 may proceed to step 706, where method 700 may decrease bandwidth allocated to an optical circuit. If there has not been a decrease, method 700 may proceed to step 708.

At step 708, method 700 may determine whether there was an increase in required bandwidth. If there has been no increase, then method 700 may return to step 702 where actual usage data may be received again after a certain period of time. If there has been an increase, method 700 may proceed to step 710.

At step 710, method 700 may increase bandwidth allocated to an optical circuit up to the remaining capacity of currently provisioned wavelengths. After increasing up to the remaining capacity, method 700 may proceed to step 712, where method 700 may determine whether additional capacity is required. If no additional capacity is required, method 700 may return to step 702 where actual usage data may be received again after a certain period of time. If additional capacity is required, method 700 may proceed to step 714.

At step 714, method may increase bandwidth allocated to alternative circuits up to remaining capacity of the currently provisioned wavelengths. As described in more detail above with reference to FIG. 5, in some embodiments it may be necessary or desirable to use alternative circuits (e.g., the path from node 102B to node 102C via node 102A as illustrated in FIG. 5) in order to optimize the number of provisioned wavelengths. After increasing the bandwidth allocated to alternative circuits, method 700 may proceed to step 716.

At step 716, method 700 may determine whether additional capacity is still required. If no additional capacity is required, method 700 may return to step 702 where actual usage data may be received again after a certain period of time. If additional capacity is required, method 700 may proceed to step 718.

At step 718, method 700 may establish a necessary number of new wavelengths to accommodate the additional bandwidth. After establishing the new wavelengths, method 700 may proceed to step 720. At step 720, method 700 may provision optical circuits with new wavelengths. After provisioning with new wavelengths, method 700 may return 702 where actual usage data may be received again after a certain period of time.

Although FIG. 7 discloses a particular number of steps to be taken with respect to method 700, method 700 may be executed with more or fewer steps than those depicted in FIG. 7. In addition, although FIG. 7 discloses a certain order of steps comprising method 700, the steps comprising method 700 may be completed in any suitable order. For example, method 700 may determine whether there is available additional capacity on current optical circuits, as well as alternative circuits, at the same time.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure, as defined by the following claims.

What is claimed is:

1. A method for dynamically reconfiguring a plurality of optical circuits between a one or more first nodes and a one or more second nodes of a communication network, the plurality of optical circuits comprising a plurality of wavelengths available for provisioning, the method comprising:
   establishing a scheduling window for receiving a plurality of optical traffic demands for traffic to be carried on the plurality of optical circuits, the optical traffic demands comprising data characterizing traffic to be transmitted over a plurality of provisioned wavelengths;
   classifying the plurality of optical traffic demands into at least a set of one or more bandwidth adjustable demands and a set of one or more fixed bandwidth demands;
   on a first plurality of optical circuits, provisioning a first set of provisioned wavelengths from the plurality of wavelengths to carry the set of one or more fixed bandwidth demands, the first plurality of optical circuits being part of the plurality of optical circuits;
   determining whether sufficient bandwidth is available on the first set of provisioned wavelengths to carry the set of one or more bandwidth adjustable demands, wherein determining whether sufficient bandwidth is available comprises adjusting the bandwidth to be allocated to the set of one or more bandwidth adjustable demands to minimize the number of provisioned wavelengths from the plurality of wavelengths while maintaining a service level agreement;
   when sufficient bandwidth is not available, on the first plurality of optical circuits, provisioning a second set of provisioned wavelengths from the plurality of wavelengths to carry the remaining bandwidth for the set of one or more bandwidth adjustable demands;
   receiving data representative of actual bandwidth usage by optical traffic;
   using the data representative of actual usage to determine whether there has been a change in the bandwidth required on a provisioned wavelength, wherein the provisioned wavelength is one of the plurality of wavelengths;
   when there has been a decrease in the bandwidth required, reducing the bandwidth allocated to the first plurality of optical circuits;
   when there has been an increase in the bandwidth required, determining whether additional bandwidth is available within the plurality of provisioned wavelengths;
   when additional bandwidth is not available within the plurality of provisioned wavelengths, determining whether additional bandwidth is available within a second plurality of optical circuits of the plurality of optical circuits, at least one of the second plurality of optical circuits further comprising a one or more third nodes between the one or more first nodes and the one or more second nodes;
   when additional bandwidth is available within the second plurality of optical circuits, transmitting a portion of the optical traffic requests over the second plurality of optical circuits; and
   when additional bandwidth is not available within the second optical circuit, provisioning a third set of provisioned wavelengths in the first plurality of optical circuits to handle the increased bandwidth.

2. The method of claim 1, wherein receiving data representative of actual bandwidth usage by optical traffic comprises periodically receiving data representative of actual bandwidth usage by optical traffic.

3. An article of manufacture for dynamically reconfiguring a plurality of optical circuits between a one or more first nodes and a one or more second nodes of a communication network, the plurality of optical circuits comprising a plurality of wavelengths available for provisioning, the article comprising:
a non-transitory computer readable medium; and
computer-executable instructions carried on the non-transitory computer readable medium, the instructions readable by a processor, the instructions, when read and executed, for causing the processor to:
establish a scheduling window for receiving a plurality of optical traffic demands for traffic to be carried on the plurality of optical circuits, the optical traffic demands comprising data characterizing traffic to be transmitted over a plurality of provisioned wavelengths;
classify the plurality of optical traffic demands into at least a set of one or more bandwidth adjustable demands and a set of one or more fixed bandwidth demands;
on a first plurality of optical circuits, provision a first set of provisioned wavelengths from the plurality of wavelengths to carry the set of one or more fixed bandwidth demands, the first plurality of optical circuits being part of the plurality of optical circuits;
determine whether sufficient bandwidth is available on the first set of provisioned wavelengths to carry the set of one or more bandwidth adjustable demands, wherein determining whether sufficient bandwidth is available comprises adjusting the bandwidth to be allocated to the set of one or more bandwidth adjustable demands to minimize the number of provisioned wavelengths from the plurality of wavelengths while maintaining a service level agreement;
when sufficient bandwidth is not available, on the first plurality of optical circuits, provision a second set of provisioned wavelengths from the plurality of wavelengths to carry the remaining bandwidth for the set of one or more bandwidth adjustable demands;
receive data representative of actual bandwidth usage by optical traffic;
use the data representative of actual usage to determine whether there has been a change in the bandwidth required on a provisioned wavelength, wherein the provisioned wavelength is one of the plurality of wavelengths;
when there has been a decrease in the bandwidth required, reduce the bandwidth allocated to the first plurality of optical circuits;
when there has been an increase in the bandwidth required, determine whether additional bandwidth is available within the plurality of provisioned wavelengths;
when additional bandwidth is not available within the plurality of provisioned wavelengths, determine whether additional bandwidth is available within a second plurality of optical circuits of the plurality of optical circuits, at least one of the second plurality of optical circuits further comprising a one or more third nodes between the one or more first nodes and the one or more second nodes;
when additional bandwidth is available within the second optical circuit, transmit a portion of the optical traffic requests over the second plurality of optical circuits; and
when additional bandwidth is not available within the second optical circuit, provision a third set of provisioned wavelengths in the first plurality of optical circuits to handle the increased bandwidth.

4. The article of claim 3, wherein, when the instructions, when read and executed by the processor, cause the processor to receive data representative of actual bandwidth usage by optical traffic, the instruction, when read and executed by the processor, cause the processor to periodically receive data representative of actual bandwidth usage by optical traffic.

5. An optical node comprising:
a reconfiguration module for dynamically reconfiguring a plurality of optical circuits between a one or more first nodes and a one or more second nodes of a communication network, the plurality of optical circuits comprising a plurality of wavelengths available for provisioning, the reconfiguration module configured to:
establish a scheduling window for receiving a plurality of optical traffic demands for traffic to be carried on the plurality of optical circuits, the optical traffic demands comprising data characterizing traffic to be transmitted over a plurality of provisioned wavelengths;
classify the plurality of optical traffic demands into at least a set of one or more bandwidth adjustable demands and a set of one or more fixed bandwidth demands;
on a first plurality of optical circuits, provision a first set of provisioned wavelengths from the plurality of wavelengths to carry the set of one or more fixed bandwidth demands, the first plurality of optical circuits being part of the plurality of optical circuits;
determine whether sufficient bandwidth is available on the first set of provisioned wavelengths to carry the set of one or more bandwidth adjustable demands, wherein determining whether sufficient bandwidth is available comprises adjusting the bandwidth to be allocated to the set of one or more bandwidth adjustable demands to minimize the number of provisioned wavelengths from the plurality of wavelengths while maintaining a service level agreement;
when sufficient bandwidth is not available, provision a second set of provisioned wavelengths from the plurality of wavelengths to carry the remaining bandwidth for the set of one or more bandwidth adjustable demands;
receive data representative of actual bandwidth usage by optical traffic;
use the data representative of actual usage to determine whether there has been a change in the bandwidth required on a provisioned wavelength, wherein the provisioned wavelength is one of the plurality of wavelengths;
when there has been a decrease in the bandwidth required, reduce the bandwidth allocated to the first plurality of optical circuits;
when there has been an increase in the bandwidth required, determine whether additional bandwidth is available within the plurality of provisioned wavelengths;
when additional bandwidth is not available within the plurality of provisioned wavelengths, determine whether additional bandwidth is available within a second plurality of optical circuits of the plurality of optical circuits, at least one of the second plurality of optical circuits further comprising a one or more third nodes between the one or more first nodes and the one or more second nodes;

when additional bandwidth is available within the second plurality of optical circuits, transmit a portion of the optical traffic requests over the second plurality of optical circuits; and when additional bandwidth is not available within the second plurality of optical circuits, provision a third set of provisioned wavelengths to handle the increased bandwidth; and an optical transmitter configured to transmit the first set of provisioned wavelengths and, if necessary, the second set of provisioned wavelengths.

6. The optical node of claim 5, wherein the reconfiguration module, when configured to receive data representative of actual bandwidth usage by optical traffic, is further configured to periodically receive data representative of actual bandwidth usage by optical traffic.

\* \* \* \* \*